United States Patent [19]

Cate et al.

[11] Patent Number: 4,845,761
[45] Date of Patent: Jul. 4, 1989

[54] LETTER MAIL ADDRESS BLOCK LOCATOR SYSTEM

[75] Inventors: Grant M. Cate, Irving; Richard K. Habitzreiter, Dallas; Kenneth T. Lovelady, Irving; Mark S. Woolston, Flower Mound, all of Tex.

[73] Assignee: Recognition Equipment Incorporated, Irving, Tex.

[21] Appl. No.: 40,359

[22] Filed: Apr. 17, 1987

[51] Int. Cl.$^4$ .............................................. G06K 9/00
[52] U.S. Cl. .......................................... 382/1; 382/48; 382/50
[58] Field of Search ....................... 382/1, 48, 50, 52; 209/584; 356/369; 250/225

[56] References Cited

U.S. PATENT DOCUMENTS

| | | | |
|---|---|---|---|
| 1,225,250 | 5/1917 | Ingersoll | 356/369 |
| 2,866,375 | 12/1958 | Wells | 250/225 |
| 3,016,789 | 1/1962 | Keston | 250/225 |
| 3,692,983 | 9/1972 | Cucciati | 382/50 |
| 3,801,182 | 4/1974 | Jones | 250/225 |
| 3,899,687 | 12/1975 | Jones | 250/568 |
| 4,013,999 | 3/1977 | Erwin et al. | 340/146.3 H |
| 4,158,835 | 6/1979 | Miura | 382/1 |
| 4,230,265 | 10/1980 | Casaly | 382/50 |
| 4,339,745 | 7/1982 | Barber | 382/67 |
| 4,468,704 | 8/1984 | Stoffel | 382/52 |
| 4,475,234 | 10/1984 | Nishijima | 382/1 |
| 4,584,703 | 4/1986 | Hallberg | 382/50 |

*Primary Examiner*—Leo H. Boudreau
*Assistant Examiner*—Jose L. Couso
*Attorney, Agent, or Firm*—Ross, Howison, Clapp & Korn

[57] ABSTRACT

A system (14) for locating possible address information contained in a window area of a mail item (40) is provided. System (14) includes a source of illumination (60) and detectors (62) for sensing the reflectivity of the mail item (40). Circuitry (34) is provided for measuring the reflectivity from the mail item (40). Circuitry (36) is provided for determining the presence of a window on the mail item (40) and the coordinates of the detected window. Circuitry (26) is provided for selecting address information contained within a window located by the window detect circuitry (36).

2 Claims, 11 Drawing Sheets

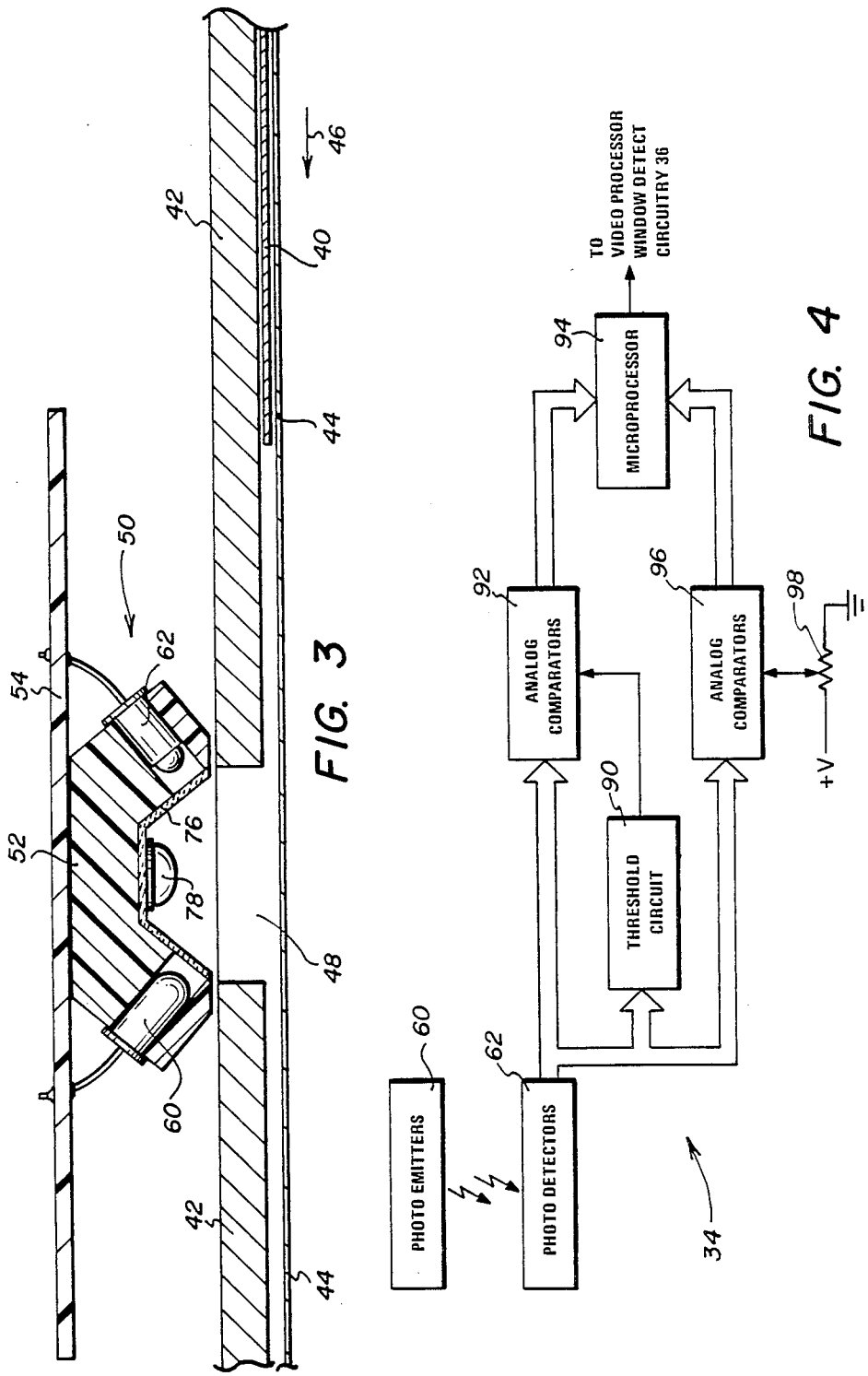

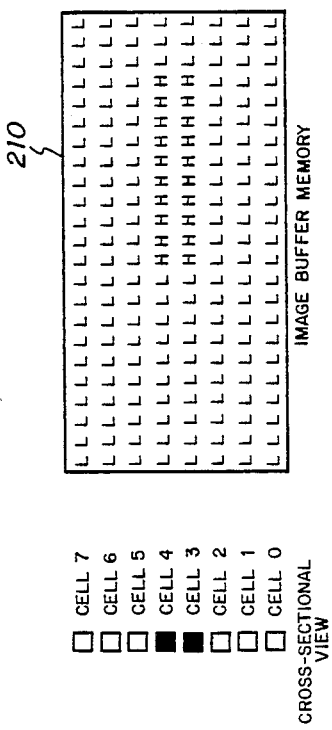
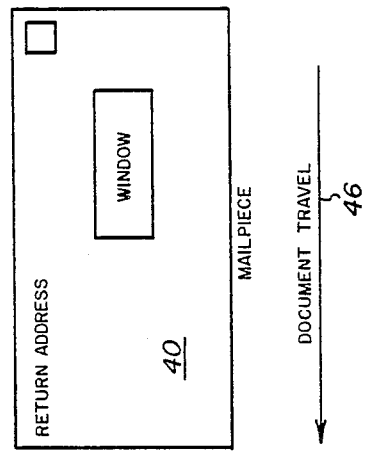
FIG. 6

LETTER MAIL ADDRESS BLOCK LOCATOR SYSTEM

TECHNICAL FIELD

This invention relates to optical character data acquisition, and more particularly to a system for detecting the location of a window on a letter mail item for assisting in the location of an address destination block contained on the letter mail item.

BACKGROUND OF THE INVENTION

Mail sorting apparatus is in wide use today for detecting a postal code number for a zone improvement program code described on each mail item, such as a postcard or a sealed letter. The detection of information utilized in the sorting process is possible when other postal information such as return addresses and advertising blocks are ignored. When the addressee's name and address are uniquely located on a mail item, reading of this information is enhanced for the sorting procedure. The location of an address block on an envelope containing the destination address has been performed using such systems as described in U.S. Pat. No. 4,013,999.

The addressee's address may be localized in a "window" area position on the letter mail item. The window area may be formed to allow the addressee's address contained on an enclosed letter to be visible through the envelope. The window area may be provided with a substantially transparent medium, such as, for example, a glassine window or cellophane film. Additionally, the window area may be a cutout in the envelope itself with no transparent covering. As used herein, the window area may also include a lable pasted on the outside of the envelope, where the label contains the destination address.

The present invention is utilized for assisting mail sorting apparatus in the location of an address block by detecting the location of a window contained on the letter mail item. The letter mail sorting apparatus independently detects the presence of lines of print on the letter mail item and utilizes information provided by the present invention relating to the presence of a window for assisting and determining the location of address blocks contained on the letter mail item. With the detection of a window area, it is more likely that the lines of print on the letter mail item detected by the mail sorting apparatus does, in fact, contain the destination address block containing the address for sorting purposes. A need has thus arisen for a window detection system capable of locating various types of windows contained on a letter mail item including, for example, labels, glassine windows and cutout windows.

SUMMARY OF THE INVENTION

In accordance with the present invention, a system is provided to locate the area or areas on a letter mail item most likely to contain the destination address block by locating the presence of a window to thereby ignore return addresses and advertising blocks contained on the letter mail item.

In accordance with the present invention, a system for locating possible address information contained in a window area on a mail item is provided. The system includes structure for illuminating the mail item and for sensing the reflectivity from the mail item caused by the illumination. Circuitry is responsive to the reflectivity to determine the location of a window on the mail item wherein the window may include a specularly reflective material, a diffusely reflective material or a spread specular reflective material. Circuitry is further provided for reading address information contained on the mail item. Additionally, circuitry is provided for selecting address information read by the reading circuitry where the address information is contained within a window located by the reflectivity circuitry.

BRIEF DESCRIPTION OF THE DRAWINGS

For a more complete understanding of the present invention and for further advantages thereof, reference is now made to the following Detailed Description taken in conjunction with the accompanying drawings in which:

FIG. 3 is a sectional view taken generally along sectional lines 3—3 of FIG. 2;

FIG. 4 is a block diagram of the present video processor window detect circuitry;

FIG. 6 is a pictorial representation of the operation of the present system for detecting the location of a window area;

DETAILED DESCRIPTION

Figure 1:
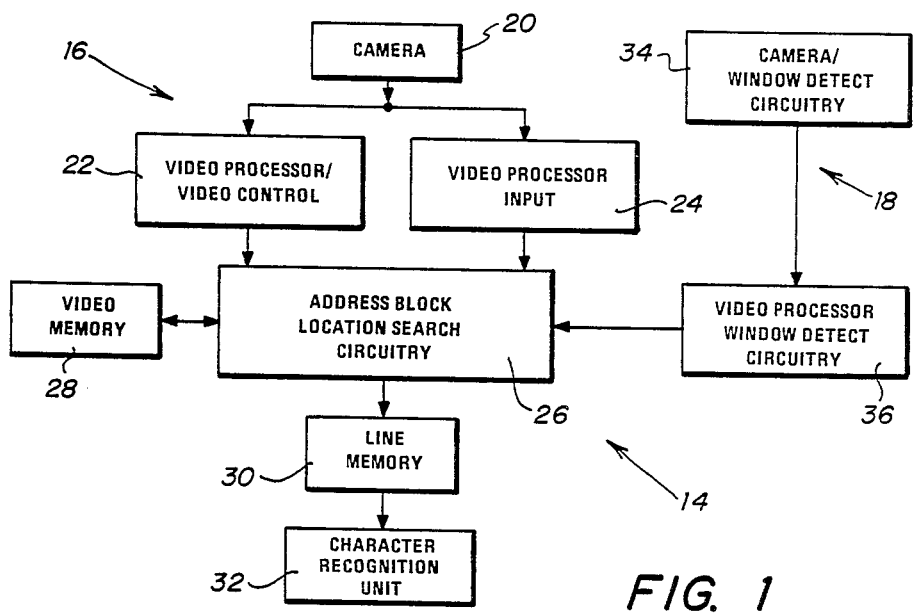
FIG. 1 is a functional block diagram of the present letter mail address acquisition system.

Referring to FIG. 1, a block diagram of an address acquisition system for determining the destination address of a letter mail item is illustrated and is generally identified by the numeral 14. Address acquisition system 14 includes an address block locator system, generally identified by the numeral 16 and the present window locator system generally identified by the numeral 18. Address block locator system 16 is generally described in U.S. Pat. No. 4,013,999 entitled "Single Read Station Acquisition For Character Recognition" issued on Mar. 22, 1977 to Jerry D. Erwin, Dale R. Duvall and Richard K. Habitzreiter. The description of U.S. Pat. No. 4,013,999 is incorporated herein by reference.

Address block locator system 16 includes a camera 20 which may comprise, for example, a self-scan photodiode array, to obtain a field of view across the width of a letter mail item. Camera 20 responds to light reflected from information contained on the letter mail item and produces output signals representing the intensity of the reflected light to a video processor/video control 22 and a video processor input 24. Video processor/video control 22 and video processor input 24 function to read and store multiple lines of information contained on a letter mail item and process this information to locate blocks of information such as, for example, a return address block, advertising information and the destination address block which is of particular importance in sorting the letter mail item. This information is transmitted to an address block location search circuitry 26 which determines the location of the various information blocks contained on the letter mail item. This information may be stored in a video memory 28, and is transmitted to a line memory 30 which stores information representing the destination address block information which is extracted from address block location search circuitry 26. The output of line memory 30 is applied to a character recognition unit 32 for identifying the destination address information.

An important aspect of the present invention is window locator system 18 which provides information to address block location search circuitry 26 in order to assist in the selection of an information block that contains the destination address. Window locator system 18 includes camera/window detect circuitry 34 which functions to illuminate the letter mail item and determine the reflectivity from a window contained on the letter mail item. The output of camera/window detect circuitry 34 is applied to video processor window detect circuitry 36 which determines the coordinates of the detected window of the letter mail item. The output of video processor window detect circuitry 36 is applied to address block location search circuitry 26 which utilizes the coordinate window information for selecting the possible destination address block.

As used herein, the present window locator system 18 is capable of locating three types of "windows". The first is a glassine window, the second is a diffusely reflective mailing label affixed to the letter mail item, and the third is a cutout window having no glassine insert. Each of these windows is characterized by a reflectivity cue. A specular component or reflection from a polished surface indicates the presence of a glassine window. Such a reflection conforms to the law of reflectivity where the angle of incidence is substantially equal to the angle of reflection of illumination from this type of window. A spread specular component as opposed to a specular component of reflectivity represents an envelope with a slick or shiny finish or a glassine window with a matte finish. A spread specular component represents approximately 40% to 60% of the specular reflectivity of an average glassine window. An envelope background generally exhibits a diffuse type reflectance and is about 20% as reflective as a specular window. The second and third types of windows, a stick-on label or the background of a window cutout without the glassine insert are also diffuse. As used herein, a "negative" window refers to a window that is less reflective than the envelope background.

The present invention provides for the ability to distinguish between specular, spread-specular and diffuse surface reflection characteristics in order to detect the presence of a window on a letter mail item. A measure of the ability to distinguish between reflection surface types is the specular-to-diffuse (S/D) ratio. In order to obtain an acceptable window detection performance with a wide variety of mail, including wrinkled and matte finish windows, and with a reasonable depth of field, a specular-to-diffuse ratio of 4 to 1 or greater is desired. The 4 to 1 ratio assumes a highly reflective plastic window which has an index of refraction of approximately 1.5 and a typical white paper envelope with a diffuse reflectance greater than 85%. The present invention operates within these tolerances and obtains approximately a 4 to 1 specular-to-diffuse ratio.

Figure 2:
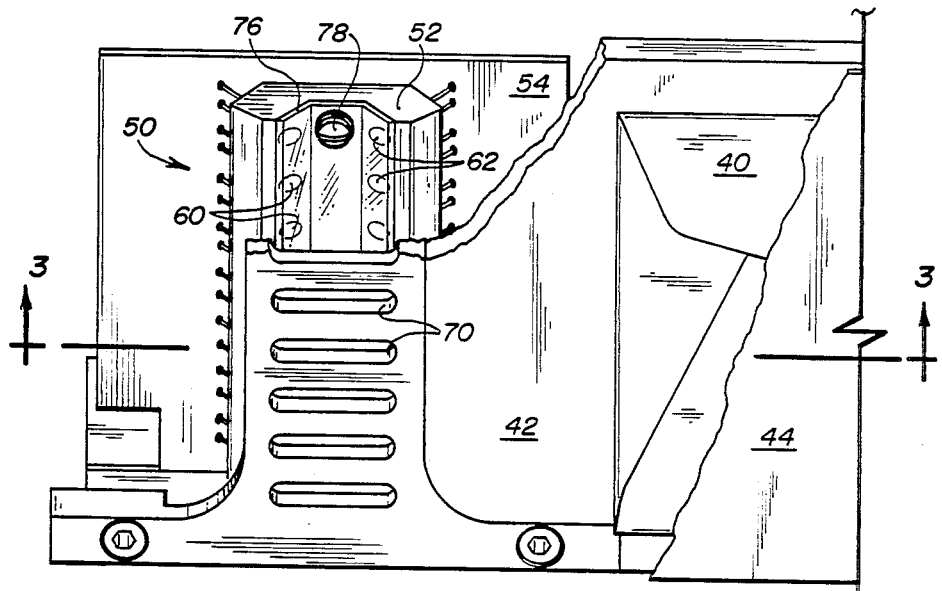
FIG. 2 is a side elevational view, partially broken, of a letter mail item and the present camera/window detect optics.

Referring simultaneously to FIGS. 2 and 3, a portion of the camera/window detect circuitry 34 is illustrated. A letter mail item 40 is disposed between a platen 42 and a transporting conveyor belt 44. The front of the letter mail item 40 is disposed adjacent platen 42. Letter mail item 40 moves in the direction of arrow 46 to a viewing slot 48 adjacent a camera 50. Camera 50 includes a holder 52 which is mounted to a printed circuit board 54. Camera 50 includes a source of illumination including a plurality of photoemitters 60 which may comprise, for example, light emitting diodes whose reflectivity is sensed by photodetectors 62 which may comprise, for example, phototransistors. As illustrated in FIGS. 2 and 3, camera 50 utilizes 8 light emitting diodes and 8 phototransistors positioned within holder 52; however, fewer or greater than 8 emitter/detector pairs can be utilized. Each emitter/detector pair is associated with a slotted aperture 70 which forms the viewing slot 48 for each emitter/detector pair. Window reflectivity from letter mail item 40 is measured by photodetector 62 whose output is applied to window detect circuitry 34 contained on printed circuit board 54. Window detect circuitry 34 will be subsequently described with respect to FIG. 4.

As previously stated, a high specular-to-diffuse ratio is accomplished utilizing the present camera/window detect circuitry 34. This ratio is accomplished utilizing a collimated illuminator, detector optics and light polarizing components. High specular-to-diffuse ratios can be obtained when the illumination optics are highly collimated, and the optical beam diameter is the same as the collimated detection optics. Accordingly, with a specularly reflecting surface, nearly 100% of the specular energy can be captured by the detector. Photoemitters 60 therefore have a narrow beam angle of approximately 7.5° to yield a collimated beam including tolerance for lens misalignment. Photoemitters 60 comprise, for example, a light emitting diode, Model H-1K, and photodetectors 62 comprise, for example, Model TIL81.

An important aspect of the present invention is the use of a polarizer 76 which is mounted to holder 52 utilizing a fastener 78. Polarizer 76 is disposed both within the illumination paths from photoemitters 60 and the reflection paths to photodetectors 62. Use of polarizer 76 enhances the specular-to-diffuse ratio by suppressing the diffuse component of the reflectivity without decreasing the specular component. Polarizer 76 passes the S component and blocks the P component of the energy reflected from the window contained on the letter mail item 40. Polarizer 76 being inserted in the illumination paths from photoemitters 60 passes the desired S component while blocking the P component originating from photoemitters 60 which further increases the specular-to-diffuse ratio. Photoemitters 60 are positioned within holder 52 to provide an angle of incidence of the illumination onto letter mail item 40 at approximately 50° from normal. Platen 42 provides a constant depth of field to within 0.040 inches. Photodetectors 62 positioned within holder 52 view the angle of reflection at approximately −50° from normal. The current of photoemitters 60 and/or the gain of photodetectors 62 can be adjusted to equalize the output amplitudes. The 8 channels are equalized so that a common threshold can be utilized to digitize all 8 outputs.

Polarizer 76 may comprise, for example, a dichroic linear sheet polarizer which absorbs or transmits lightwaves depending on their plane of vibration. Such a polarizer is similar to an HN38 linear polarizer manufactured and sold by Polaroid Corporation. Polarizer 76 may consist of a polarizing film sandwiched between two pieces of plastic which have a scratch-resistant coating. The maximum thickness is about 0.030 inches.

Referring now to FIG. 4, window detect circuitry 34 is further illustrated and includes a dynamic threshold circuit. The output of photodetectors 62 is applied to a threshold circuit 90 which computes the average of the sum of the outputs of photodetectors 62 which is sum of the 8 channels (assuming that 8 photoemitter 60/photodetector 62 pairs are utilized in the present camera 34) divided by 8. Threshold circuit 90 also adds a fixed offset. The offset is selected high enough to prevent false window indications or noise on letter mail item 40. The average plus offset is scaled, such that the amplitude of a window must be, for example, 30% to 50% higher than the background average in order for the area on letter mail item 40 to be designated a "window". This dynamic threshold allows a window indication on diffuse or specular backgrounds.

Figure 5A:
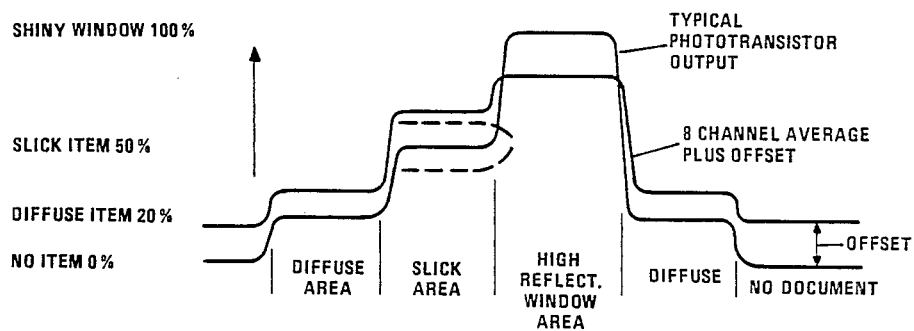
FIGS. 5a, 5b and 5c are voltage waveforms illustrating operation of detection thresholds of the present invention.

FIG. 5a illustrates the output of photodetectors 62 for diffuse, slick and specular energy at a specular-diffuse ratio of 5 to 1. Overlaid on FIG. 5a is the "average" threshold as well as the threshold of an unlikely mail item to illustrate the three different energy levels and the "average" threshold on the same scale.

The output of threshold circuit 90 representing a dynamic threshold voltage is applied to analog comparators 92 which also receive the output of photodetector 62 which digitizes the channels of data from photodetector 62. The output of analog comparators 92 is applied to a microprocessor 94 which generates the window bits for output in a serial bit stream to video processor window detect circuitry 36.

Figure 5B:
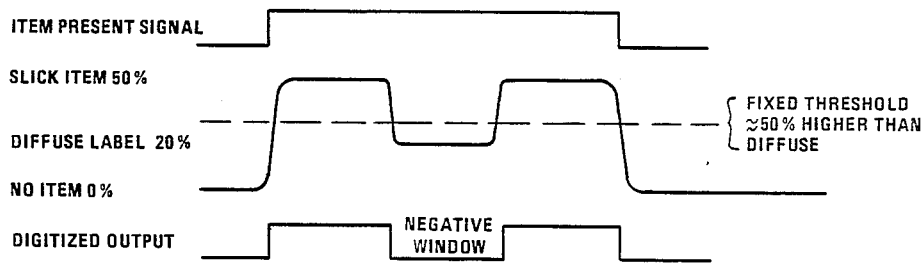
Figure 5C:
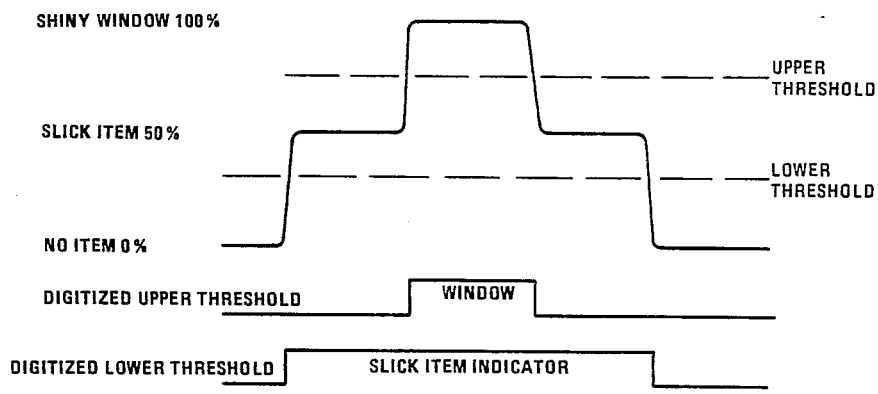

As previously stated, the dynamic threshold implemented by threshold circuit 90 will properly digitize a window on a diffuse or specular background, but the dynamic threshold does not provide assistance in identifying a "negative" window as shown in FIG. 5b. Window detect circuitry 34 therefore includes a second set of analog comparators 96 which receive the output of photodetectors 62. Analog comparators 96 operate with a fixed threshold set by a variable resistor 98 having a threshold of approximately 50% higher than the diffuse or dynamic threshold set by threshold circuit 90. The output of analog comparators 96 is applied to microprocessor 94 to generate the window bits. The use of both analog comparators 92 and 96 allow for the detection of all three types of windows. As illustrated in FIG. 5c, a further variation can be accomplished utilizing the present window detect circuitry 34. A lower threshold is set at 50% above the white diffuse level and the upper threshold is set above the highest slick background value.

FIG. 6 is a pictorial illustration of the operation of the present window locator system 18. The front of a letter mail item 40 is illustrated adjacent to the 8 slotted apertures 70 corresponding to the 8 photoemitter 60/photodetector 62 pairs. Window detect circuitry 34 (FIG. 4) generates 8 bits of data or cells for each sample position across letter mail item 40. Each cell represents the presence or absence, low output or high output, respectively, of a portion of a window at the particular cell location. Video processor window detect circuitry 36 contains a memory, to be subsequently described, which contains an image of the detected window as well as the coordinates of the window with respect to the letter mail item 40. The cells of the window area are represented by a high output signal with the remainder of the reflectivity information from the letter mail item 40 being represented by a low output signal. The cross-sectional view of the 8 cells of data across letter mail item 40 is taken, for example, every 2.51 milliseconds which represents approximately 0.3 of an inch of travel of the letter mail item 40. Output of microprocessor 94 represents the 8 bits of data each 2.51 milliseconds as letter mail item 40 moves adjacent camera 50.

Video processor window detect circuitry 36 converts the serial data output by microprocessor 94 into a parallel data stream and processes that data to determine if a window is present on the mail item 40. Circuitry 36 determines if any of the bits output by microprocessor 94 is a logic 1 or high. If none of the output bits are high, circuitry 36 outputs an indication to address block location search circuitry 26 (FIG. 1) that no window is present. If any of the cells output by window detect circuitry 34 is a logic 1 or high, circuitry 36 builds a cross section of letter mail item 40, and, in so doing, builds a "picture" of each window area detected. The start and end of the window are detected as well as the top and bottom of the window.

Figure 7:
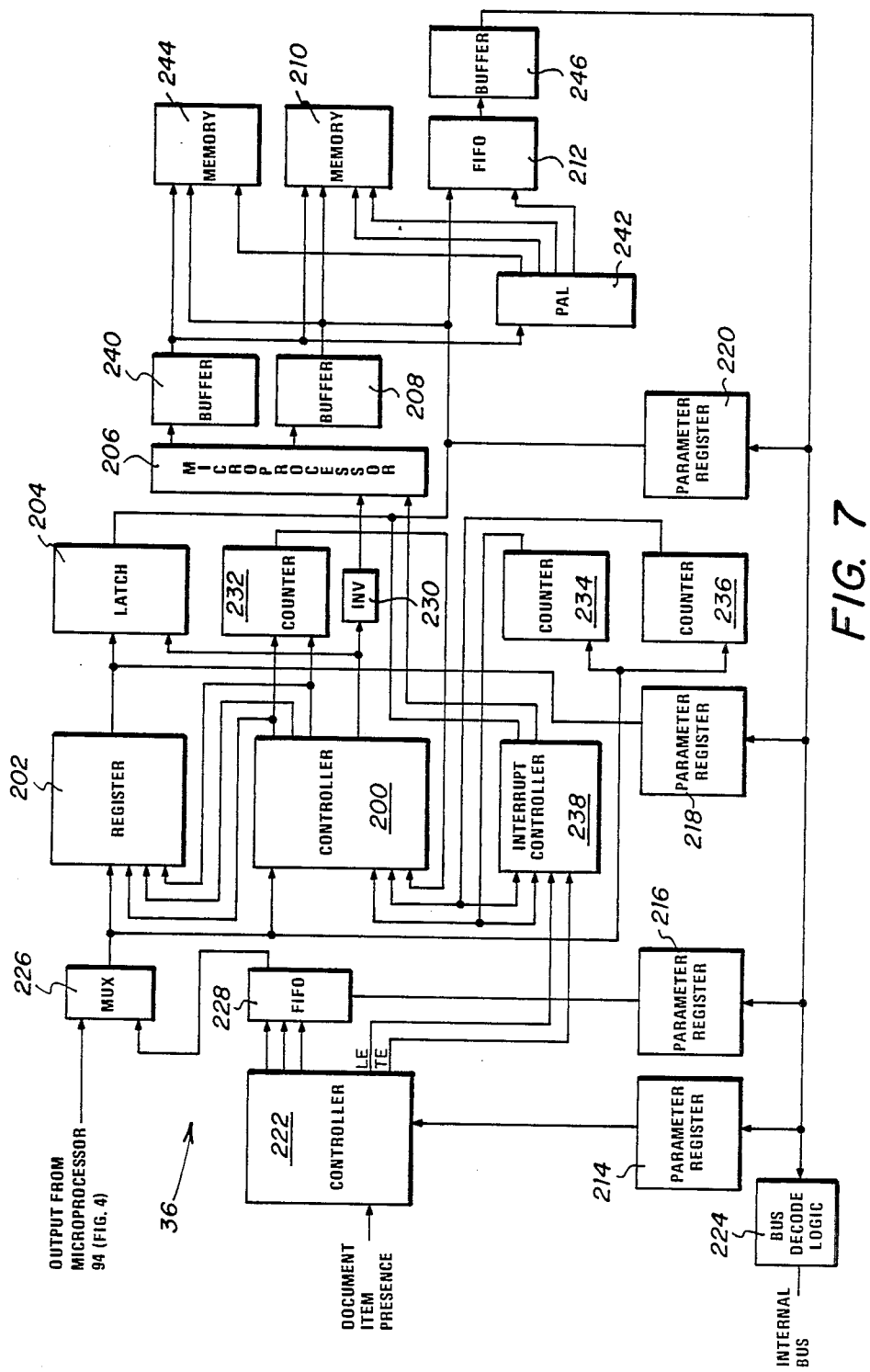
FIG. 7 is a schematic block diagram of the video processor/window detect circuitry of the present invention.

Referring now to FIG. 7, the video processor window detect circuitry 36 (FIG. 1) determines whether a window is of sufficient size and, if so, the location of the window on the letter mail item 40. Once the coordinates (TOP, BOTTOM, START, and END) of the window have been calculated, circuitry 36 passes this data to the address block location search circuitry 26 (FIG. 1) which uses this information to find the most likely address block on the front of a letter mail item 40 which contains the destination address.

Circuitry 36 receives serial coded data from window detect circuitry 34 (FIG. 1). The protocol for the serial data is one start bit, eight data bits, followed by seven stop bits. Since circuitry 34 and circuitry 36 operate asynchronously, circuitry 36 utilizes a serial synchronous controller 200 which synchronizes the incoming data with an internal clock. The controller 200 operates at eight times the incoming frequency which allows controller 200 to sample each data bit eight times. While the controller 200 is sampling the data, it looks for high to low or low to high transitions. Controller 200 then outputs a data strobe in the center of the data bit to ensure the data captured is valid. With the degradation of the data over the long transmission line, this method of synchronization is necessary to ensure the validity of the data.

The controller 200 shifts the serial bits into a serial to parallel shift register 202 until a count of eight is reached. At this time the controller 200 transfers the data from serial to parallel shift register 202 to a holding latch 204, clears the serial to parallel shift register 202 and sends a segment interrupt to a microprocessor 206. Once the interrupt is sent and the serial to parallel shift register 202 is cleared, the controller 200 counts the number of stop bits received. As soon as seven stop bits are received, the controller 200 loops back and starts the process over again. The microprocessor 206 receives segment interrupts every 2.51 milliseconds but only processes the data between leading and trailing edges of the mail item 40. After leading edge of the mail item 40 has occurred, when the microprocessor 206 receives a segment interrupt from controller 200, microprocessor 206 places the data into a buffer memory 208 and performs a logical OR with the previous data. This builds a cross sectional view while the image of the document is being placed in an image buffer 210 (FIG. 6). When the microprocessor 206 receives a trailing edge interrupt, telling it that there is no more data to process, it compares the cross sectional view to zero to see if a window is present.

When there is a window present the microprocessor 206 looks at the cross sectional view to determine what cell the window starts on. Starting at vertical cell position 0, comparisons are made to determine which is the first active cell of the window. Once the first active cell is found the microprocessor 206 saves that cell position as the BOTTOM coordinate and checks the same position in the image buffer memory 208 from the first to the last scan to determine what scan the window starts and ends on. This will yield the START and END coordinates. The microprocessor 206 keeps a count of how many cells in the horizontal position are active. If less than 20% of the cells were active the START and END coordinates are discarded for that vertical cell position. The microprocessor 206 then moves up to the next vertical cell position and continues the same process until it finds an inactive cell. At this time it saves this cell position as the TOP coordinate.

Once all four coordinates have been found, the microprocessor 206 checks the height and length of the located window to verify that it is within the specification for a valid window. If all of the specifications are met, the microprocessor 206 moves the coordinates into an output buffer where they wait to be output to the circuitry 26 (FIG. 1).

The actual camera of camera/window detect circuitry 34 is positioned in front of camera 20 which causes circuitry 36 to finish processing before the data is actually needed. Circuitry 36 can spool as many as 3 mail items 40 before circuitry 36 must output the results to circuitry 26. The microprocessor 206 starts a counter for each set of coordinates that need to be output and when the count has exhausted itself it transfers the coordinates for that mail item 40 to an output FIFO 212 for circuitry 26 to read. After a predetermined amount of time the microprocessor 206 clears the FIFO 212 and waits for the next counter to count down to zero.

Circuitry 36 is mapped into eight words of the microprocessor 22 contained within the video processor's address range. Microprocessor 206 communicates with circuitry 26 through parameter registers 214, 216, 218 and 220 located at these addresses. The parameter registers are used to control online and diagnostic operations, and for transferring the resulting window coordinates to the microprocessor 206. Commands that are written to parameter register 214 are read and executed by a diagnostic controller 222. The commands are used to reset circuitry 36, generate diagnostic clock and control signals, and enable online or diagnostic mode.

Circuitry 36 includes an internal bus decode logic 224 which provides a method for the microprocessor 206 to communicate with the circuitry 26. This logic decodes a specific address space that is dedicated to the parameter registers 214, 216, 218 and 220.

The diagnostic controller 222 monitors parameter register 214 to determine what command, if any, needs to be executed. These commands can be diagnostic commands as well as online commands. When the diagnostic controller 222 is initially powered up all of the outputs are inactive. The controller 222 then starts monitoring the command enable signal which is the write enable of parameter register 214. Once this signal is received the controller 222 jumps to state three to determine what command is to be executed. If the command is not defined the controller 222 returns back to state zero and waits for the next command enable. If the command is recognized, the controller 222 executes the command and returns back to state zero and waits for the next command enable.

The controller 222 also monitors the input signal, document item presence. When the signal goes active (low) the controller 222 outputs Leading Edge Interrupt (LE) for one clock period. As soon as the document item presence signal goes inactive (high) the controller 222 outputs Trailing Edge Interrupt (TE) for one clock period. These two signals interrupt microprocessor 206 informing it of the times to start and stop data collection.

An input data multiplexer 226 receives the output of circuitry 34 and provides a method of inputting diagnostic data from controller 222 instead of online data.

Controller 222 outputs data to a serial data FIFO 228 which is configured to be a 9 bit parallel input and a 1 bit serial output. FIFO 228 allows diagnostic data to be parallel loaded from parameter register 216 with any test data required and then serially shifts this data out, thereby simulating online operation. The output of the FIFO 228 feeds the input data multiplexer 226 so that during diagnostics the circuitry 36 is actually processing the data that is written into FIFO 228. FIFO 228 is controlled by commands written to parameter register 214. These commands are received by controller 222 which outputs the corresponding control signals to FIFO 228 in order to implement the command.

The output of multiplexer 226 is applied to serial to parallel shift register 202 which receives the incoming serial data and converts it to parallel data for use by microprocessor 206. The control of serial to parallel shift register 202 is complicated due to the fact that the data coming into circuitry 36 is asynchronous to the internal data clock. Controller 200 is used to keep track of when and how much data should be shifted into serial to parallel shift register 202. Serial to parallel shift register 202 has three control signals that performs the operations necessary to convert the data into a parallel data stream which are provided by controller 200.

After 8 clocks have been output the controller 200 outputs a register clock which transfers the captured serial data to a parallel output holding latch 204 and interrupts microprocessor 206 via an inverter 230 telling microprocessor 206 that there is data ready to be processed. After the data has been transferred to latch 204, the serial to parallel shift register 202 is cleared and new data is written in.

Serial synchronous controller 200 synchronizes the incoming data to the internal data clock by controlling the serial to parallel shift register 202. The controller 200 operates at approximately 8 times the incoming data frequency in order to sample the data for changes.

The output of serial to parallel shift register 202 is applied to parallel data latch 204 which stores the data from the serial to parallel shift register 202 until the microprocessor 206 can accept it. This allows the input section of circuitry 36 to start processing the next byte of data while the microprocessor 206 finishes processing the current byte of data. Diagnostic data can be transferred to this latch 204 via parameter register 218 which allows the data path along with the microprocessor 206 to be fully tested.

Controller 200 outputs clocks to a serial bit counter 232 which consists of a 4 bit binary counter that is controlled by the serial synchronous controller 200. When the controller 200 receives a start bit it clears the counter 232. Each time the controller 200 sends out the strobe signal to clock the data into the serial to parallel shift register 202, counter 232 is incremented. The fourth bit of counter 232 is tied back to the serial controller 200 so that when a count of 8 is reached the controller 200 will know that it has finished processing the current byte of data.

The output of multiplexer 226 is applied to input data high counter 234 and input data low counter 236. The input data high counter 234 consists of an 8 bit binary counter that tracks the input data to insure that circuitry 34 (FIG. 1) is still functional. The counter 234 is a free running counter that runs at 8 times the frequency of the incoming data. The incoming data is inverted and used as the clear signal for the counter 234. If the incoming data does not go low before 255 clocks have passed (which is about 31 data bits) the counter 234 sends an interrupt to the microprocessor 206 telling microprocessor 206 that circuitry 34 is not functioning properly.

The input data low counter 236 consists of an 8 bit binary counter that tracks the input data to insure that circuitry 34 (FIG. 1) is still functional. The counter 236 is a free running counter that runs at 8 times the frequency of the incoming data. The incoming data is used as the clear signal for the counter 236. If the incoming data does not go high before 255 clocks have passed (which is about 31 data bits) the counter 236 sends an interrupt to the microprocessor 206 telling microprocessor 206 that circuitry 34 is not functioning properly.

Controller 222 and counters 234 and 236 provide inputs to an interrupt controller 238 which includes a single programmable array logic device (PAL). When a device needs to interrupt the microprocessor 206, controller 238 sets a bit inside the PAL and the PAL generates the interrupt to the microprocessor 206. When the microprocessor 206 services the interrupt it reads the output of the PAL in order to determine which device needs servicing. When microprocessor 206 has completed servicing the device, microprocessor 206 writes that particular bit back to the interrupt controller 238 which resets the bit inside the PAL. If more than one device needs servicing, the microprocessor 206 services them in a round-robin order. As long as a bit is set inside the PAL the interrupt will remain active and the microprocessor 206 will continue servicing them.

Parameter register 214 is a bidirectional latch that acts as a command register between circuitry 36 and circuitry 34. When circuitry 34 requires circuitry 36 to perform a certain command, the command is written to register 214. Parameter register 216 is a 9 bit data latch that injects diagnostic data into the diagnostic FIFO 228. Circuitry 34 writes the diagnostic data into register 216 and then sends the command to parameter register 214 that will write the data into the diagnostic FIFO 28. Parameter register 218 is an 8 bit bidirectional latch that injects diagnostic data into the parallel data latch 204. Circuitry 34 writes diagnostic data to register 218 and then sends a command to the microprocessor 206 instructing microprocessor 206. This process verifies the incoming data path and determines whether microprocessor 206 is operating properly. Parameter register 218 can also read data from the output of the serial to parallel shift register 202. This verifies that the input data path along with the serial synchronous controller 200 are working properly.

Microprocessor 206 may comprise, for example, a Model 9995 microprocessor, manufactured by Texas Instruments, Inc. of Dallas, Tex. and includes a microprocessor, two address drivers, a data transceiver, and a clock oscillator. Microprocessor 206 includes an 8 bit data bus and is capable of addressing up to 64K bytes of memory. The oscillator provides the clock to the microprocessor 206. Microprocessor 206 receives the window data from the parallel data latch 204. The operation of microprocessor 206 in calculating the window coordinates will subsequently be described in connection with FIGS. 8-14.

Associated with microprocessor 206 is an address buffer 240 which consists of two 74LS244 line buffers. These buffers are used to isolate the microprocessors address bus from the remainder of the logic. This isolation also aids in the drive capability of the address bus. Data buffer 208 consists of a 74LS245 bidirectional data buffer. This buffer is used to isolate the microprocessors data bus from the remainder of the logic.

The output of buffer 240 is applied to a microprocessor memory select PAL 242 which outputs the control for selecting program memory 244, data memory 210, output FIFO strobes 212, Read and Write signals, and microprocessor 206 I/O space. A portion of the microprocessor 206 memory space is reserved for memory mapped I/O.

Memory 244 consists of, for example, either a 2764 EPROM or a AM27S49 PROM. In order to operate the microprocessor 206 without automatic wait states the program memory 244 must have an access time of less than 120 ns. The PROM is fast enough to operate without wait states. The microprocessor data memory 210 is made up of one 8K by 8 static RAM. Memory 210 is used to store program variables, data pointers. and the microprocessor stack memory. Memory 210 is controlled by the memory select PAL 242. Depending upon what operation the microprocessor 206 is performing, reading or writing, the memory select PAL 242 sends out the control lines necessary to communicate with the memory 244 and 210.

Window data from latch 204 is applied to FIFO 212 which consists of two FIFOs that can contain a maximum of 512 bytes of data. The shift in portion of the FIFOs are controlled by the memory select PAL 242. When the microprocessor 206 needs to write data into the FIFO 212, it writes to address 4000H for the even byte and 4001H for the odd byte. The memory select PAL 242 decodes these addresses and sends out the output FIFO write signals. The FIFOs are arranged in parallel so that circuitry 26 can read the data back as a 16 bit word. Circuitry 26 reads the data from the output FIFOs 212 by reading parameter register 220.

The output of FIFO 212 is applied to a data buffer 246 which enables the FIFO data onto the internal data bus each time circuitry 26 reads parameter register 220. The buffer 246 is made up of two 74LS244s data buffers. The outputs are in Tristate condition until circuitry 26 reads from parameter register 220.

Figures 8, 9:
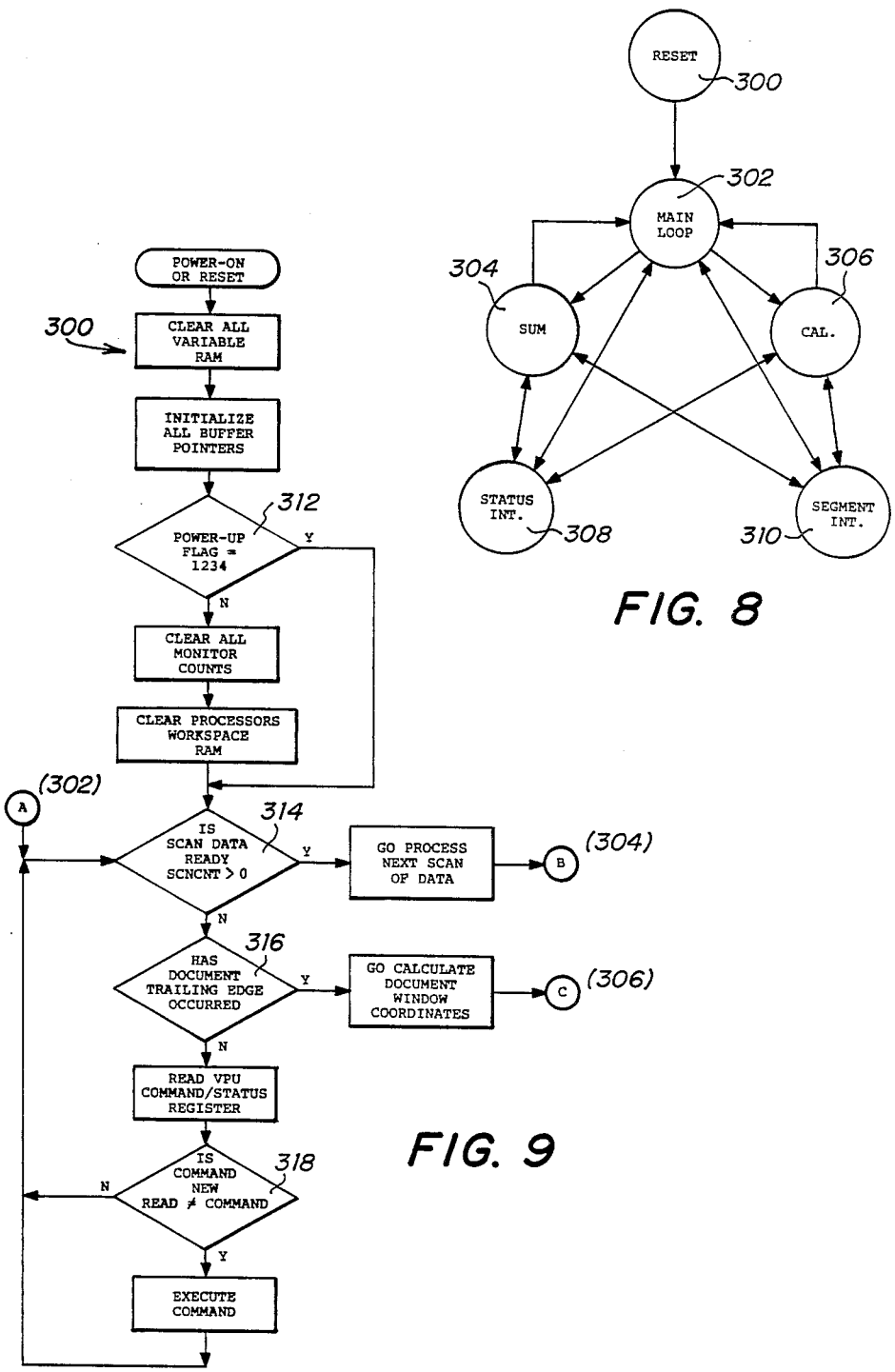
FIG. 8 is a block diagram interrelating the present software subroutines for determining the coordinates of a window on a letter mail item.
FIGS. 9–14 are flow diagrams of the present software subroutines for determining the coordinates of a window on a letter mail item.

Referring now to FIGS. 8-14, a description of a software utilized for calculating the window coordinates performed by microprocessor 206 (FIG. 7) will now be described. FIG. 8 illustrates the basic subroutines of the software programs utilized with the present invention. The system undergoes a reset performed by subroutine 300. Upon completion of the power up or reset, the main loop subroutine 302 is executed. The main loop subroutine 302 polls window detect circuitry 36 to determine if there are any diagnostic commands or if there is any data available from camera/window detect circuitry 34 to be processed. If neither of those events occur, the main loop subroutine 302 continues to poll circuitry 34 and circuitry 36.

When a scan from a camera/window detect circuitry 34 is detected, the program continues with the sum subroutine 304 which functions to build a vertical cross sectional view of the data from circuitry 34. This cross sectional view is illustrated in FIG. 6. On completion of the sum subroutine 304, the program returns to the main loop subroutine 302. The main loop subroutine 302 and sum subroutine 304 continue to process data received from circuitry 34 until the trailing edge of the letter mail item 40 occurs. Upon the occurrence of the trailing edge of the mail item 40, the main loop subroutine 302 jumps to the calculation routine 306 which functions to calculate the coordinates of a detected window. The subroutine programs also include a status interrupt subroutine 308 and a segment interrupt subroutine 310. Status interrupt subroutine 308 functions to inform microprocessor 206 that an item presence on a leading edge of a mail item 40 has been received or a trailing edge on the mail item 40 has been received. Segment interrupt subroutine 310 informs microprocessor 206 that a full byte of data has been received from camera/window detect circuitry 34 and the scan is ready to be processed. Segment interrupt subroutine 310 sets a flag in the sum subroutine 304.

Referring now to FIG. 9, a portion of subroutine 300 is illustrated. On power up or reset, microprocessor 206 clears all variable RAM memory and initializes all buffer pointers that point to the image buffer 246 and to the cross sectional view buffer 208. After the pointers are initialized, an inquiry is made at 312 to determine if a power-up flag is equal to 1234. If the flag does not equal 1234, the decision inquiry 312 determines that the condition is a power up condition and not a reset condition so that all monitor counts are cleared and the processor work space RAM is cleared. If the condition is a reset, the monitor counts and workspace RAM are not cleared.

The program continues at an inquiry 314 to determine if the scan data is ready by checking to determine if the scan count is greater than 0. If the scan count is greater than 0, the program continues to the sum subroutine 304, page connector "B". If the scan is not ready, an inquiry is made at 316 to determine if the trailing edge has occurred. If the trailing edge has occurred, the program continues with the calculation subroutine 306, page connector "C" to determine the coordinates of the window. If the trailing edge has not occurred, microprocessor 206 reads the command and status registers of circuitry 36, and an inquiry is made at 318 to determine if a new command or an old command is present. If a new command is present, it is executed and the program returns to inquiry 314 to determine if a new scan update is ready.

Figure 10:
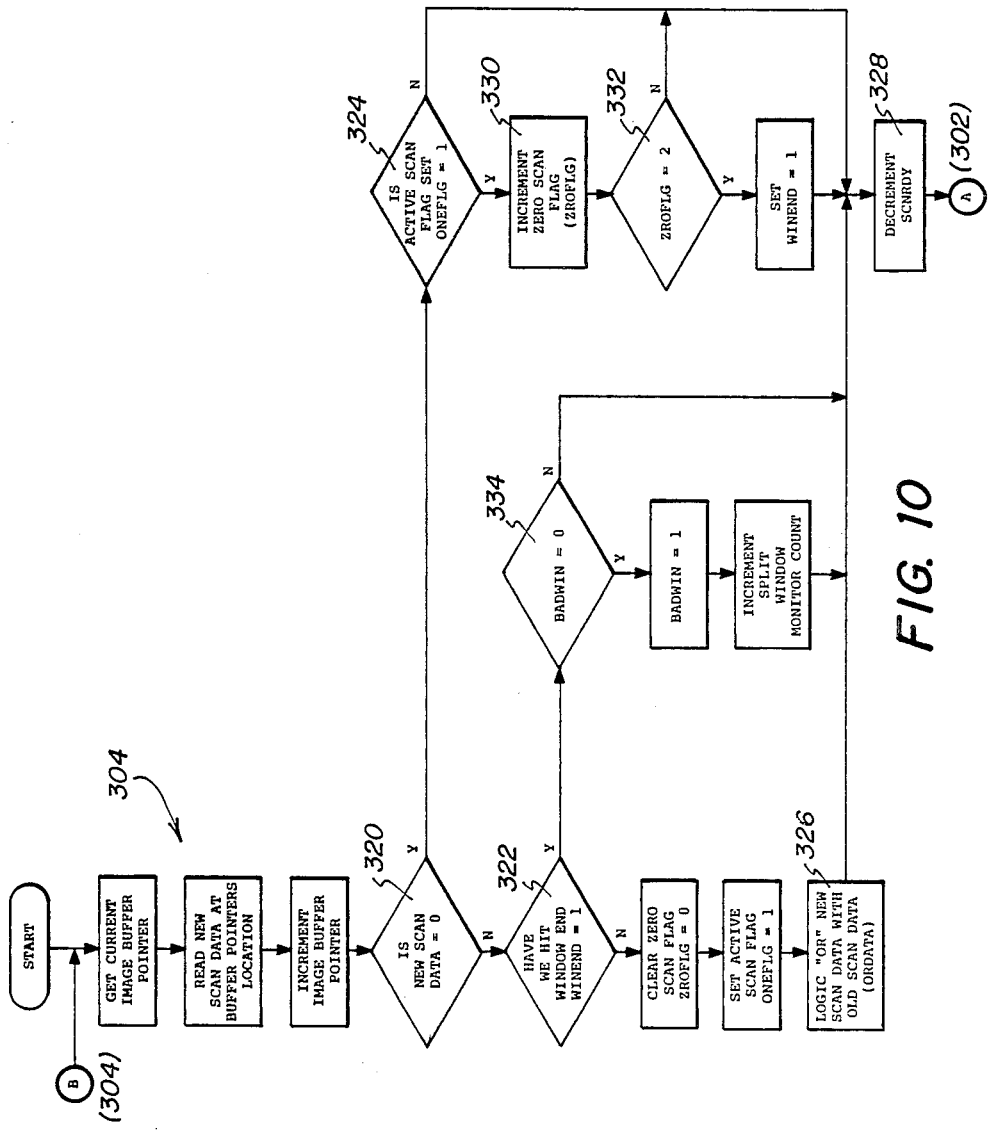

FIG. 10 illustrates the sum subroutine 304. The microprocessor 206 obtains the pointer to the image buffer that indicates where the actual image is stored. The data is read indicating the last scan that has been processed and the scan pointer is incremented after the scan line of data has been run. An inquiry is made at 320 to determine if the data is 0. If the data is not 0, an inquiry is made at 322 to determine if the end of the window has been located. If the new scan data is 0, a determination is made at inquiry 324 to determine if the active scan flag has been set. If an active scan has been passed by more than two scans, these two scans are linked together to indicate an active window.

If the decision at inquiry 322 is no, a 0 scan flag is cleared which is the end of the window flag and the active scan flag is set to a 1. A logical or function is performed between the new scan data and the old scan data at step 326. The flag is decremented at step 328 and the sum subroutine 304 returns to subroutine 302 of the main loop.

If the scan data was 0 at inquiry 320, and the decision at inquiry 324 was that the flag was set, the 0 scan flag is incremented at step 330. The 0 scan flag is incremented to monitor where the window has ceased to exist to determine if the window begins again. An inquiry is made at 332 to determine if the 0 flag equals 2 which indicates that for two scans, there have been o active cells indicating that a window has terminated. If there has been two inactive cells, the window and count is decremented to 1 and the program returns to the subroutine 302.

If the decision at inquiry 322 was yes, then there are two inactive scans, inquiry is made at 334 to determine if the bad window flag has been set. If the bad window flag has been set, it is decremented to be set to 1 and the split window monitor count is incremented. The program returns to the subroutine 302. The setting of the split window monitor count indicates that two windows exist on a single mail item 40 where the windows are side by side and greater than two scans wide. The presence of a bad window is indicated to the calculation routine 306, such that calculation routine 306 does not calculate the coordinates of the window.

Figure 11A:
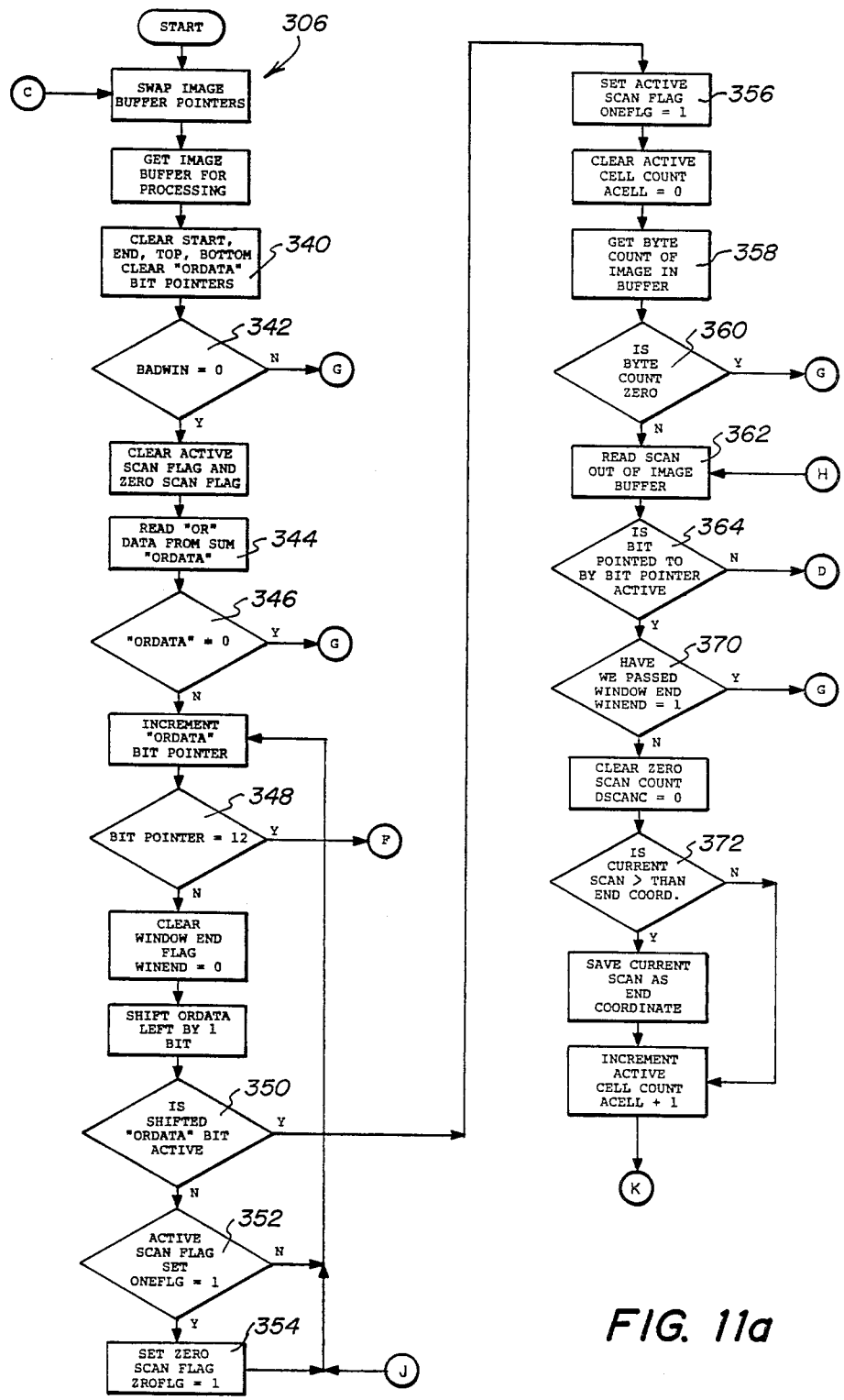
Figure 11B:
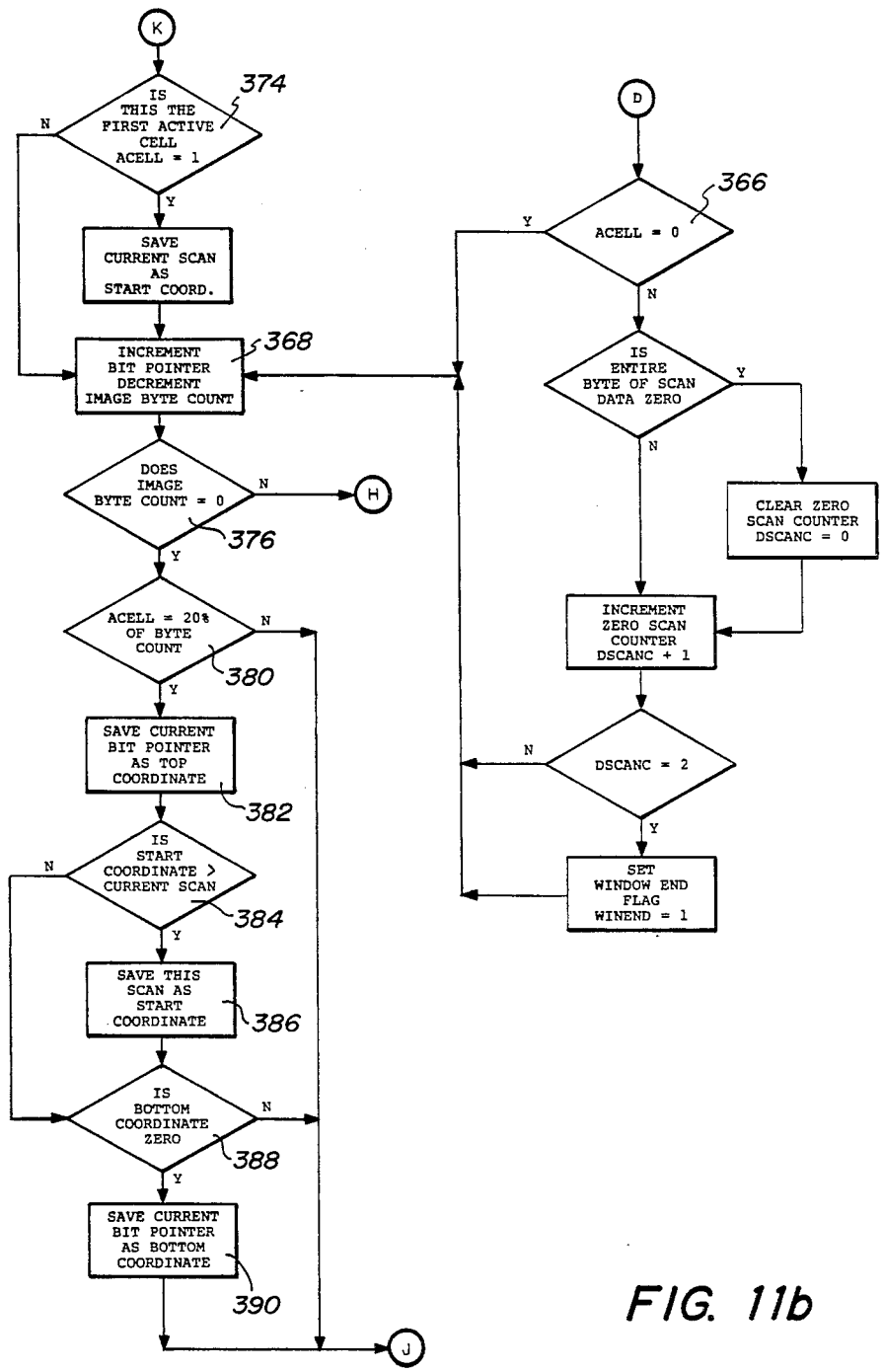

Referring now to FIGS. 11A and 11B, the calculation subroutine 306 is illustrated. The image buffers are swapped so that calculation routine 306 will be processing from an old document so the image buffer can be receiving data from a new document. The coordinate buffers are cleared at step 340 including the start, end, top and bottom buffers. The OR data pointer is also cleared to start at cell 0. Calculation routine 306 then determines at inquiry 342 whether a bad window has been detected. If bad window equals 0, the program continues to FIG. 12 via page connector "G" which zeroes the coordinates of the window and the program returns to subroutine 302. If the coordinates of the window are equal to 0, no window is detected and output from circuitry 36 (FIG. 1). The calculation subroutine 306 is therefore skipped.

If a bad window did not occur, the program clears the active scan flag and 0 scan flag and the OR data is read at step 344. The determination is made at inquiry 346 to determine if the cross sectional data or the OR data is 0. If the data is 0, the calculation subroutine 306 is completed and the program exits to FIG. 12 via page connector "G". If the OR data is not 0, the pointer is incremented that points to the cell of the OR data. A determination is made at inquiry 348 to determine if the top cell has been passed if the bit pointer is equal to 12. If the top cell has been passed, the program continues to FIG. 12 via page connector "F". If the top cell has not been reached, the window end flag is cleared which indicates that the last active cell has been located and the OR data is shifted by 1 bit position. A decision is then made at inquiry 350 to determine if the shifted OR data bit is active if the shifted bit is not active, the determination is made at inquiry 352 to determine if the active scan flag is set. If the flag is not set, it is set at step 354. If the bit is not active, the subroutine determines if it has already possessed an active 1 and if so, the 0 scan flag is set to indicate that the top of the window has been located.

If the decision at inquiry 350 was yes, the bit being active, the program sets the active scan flag to 1 at step 356 indicating that an active cell is being processed. The active cell count is then cleared. The byte count of the image buffer is then obtained at step 358 and a determination is made at inquiry 360 to determine if the byte count is 0. If the byte count is 0, the program continues at FIG. 12 via page connector "G". A byte count of 0 as previously stated indicates that no image is present and there is no data in the buffer to be processed.

If the byte count is not 0, the scan is read from the image buffer at step 362. As each scan is read from the image buffer, a determination is made at inquiry 364 to determine if each bit is active. If a bit is not active, the program continues via page connector "D" to FIG. 11b to inquiry 366. At inquiry 366 a decision is made to determine if an active cell already exists, if so, the bit pointer is incremented and the image byte count is decremented to move to the next cell.

Returning again to FIG. 11a, if the decision of inquiry 364 is yes, an inquiry is made at 370 to determine if the end of the window has been passed. If the window has not been passed, the 0 scan count is cleared. If the end of the window has been passed, the program continues via page connector "G" to FIG. 12. The zero scan count indicates how many scans are 0 and if there are more than 2 zero scan counts, a split window is indicated. A determination is made at inquiry 372 to determine whether the current scan is greater than the scan logged into the end coordinate. If this condition exists, the current scan is saved as the end coordinate and the active cell count is incremented. The program continues via page connector "K" to FIG. 11b.

Referring now to FIG. 11b, a determination is made at inquiry 374 to determine if an active cell was the first active cell of the line. If this decision is yes, the cell is saved as the start coordinate. The bit pointer is incremented and the image byte count is decremented at step 368 which moves up one more cell in the vertical cell view and moves to the next scan of image buffer. A determination is made at inquiry 376 to determine if the image byte count is 0 indicating that the program has reached the end of the image. If the byte count is not 0 the program returns to step 362 (FIG. 11a) via page connector "H" to read another scan from the image buffer. The process continues moving down the image until the image byte count is 0 at which point a decision is made at inquiry 380 to determine if the active cell count is 20% or more of the cells. If 20% of the cells are not active, this indicates that the window is too small and is a bad window. The program returns to step 354 via page connector "J" to FIG. 11a.

If twenty of the cells are active, the current bit pointer is saved as the top coordinate at step 382. A decision is made at inquiry 384 to determine if the start coordinate is greater than the current scan number, if so, the scan is saved as the start coordinate at step 386. If the start scan of the current scan is less than previously logged, this scan will not be saved as the start coordinate. The decision is then made at inquiry 388 to determine if the bottom coordinate is 0. If the bottom coordinate is 0, the current bit pointer is saved as the bottom coordinate. The first time through the program, the top coordinate equals the bottom coordinate. Calculation routine 306 continues to loop between step 390 and step 362 which moves across the cells in the horizontal position. Program between inquiry 346 and step 362 moves across the cells in the vertical direction.

Figure 12:
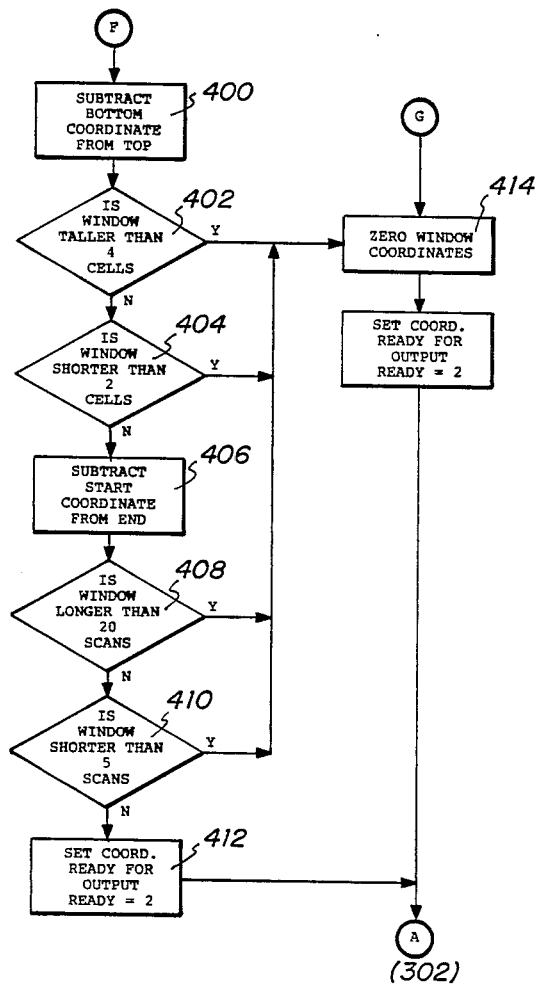

At the completion of processing by the calculation routine 306, at inquiry 348 (FIG. 11a) the program continues via page connector "F" to FIG. 12. After the coordinates have been found for the window, the bottom coordinate is subtracted from the top coordinate at step 400 (FIG. 12). The determination is made at inquiry 402 to determine if the window is greater than four cells tall. If the window is shorter than four cells tall, a determination is made at inquiry 404 to determine if the window is shorter than two cells. The height restriction for determining whether a window is present is that the height must be two cells or more but four cells or less. If this condition exists, the start coordinate is subtracted from the end coordinate at step 406. A decision is made at inquiry 408 to determine if the window is longer than 20 scans. If the window is not longer than 20 scans, a decision is made at inquiry 410 to determine if the window is shorter than five scans. If both these conditions are met, the coordinates are output at step 412 to the main loop subroutine 302 for output to circuitry 26 (FIG. 1).

In the preferred embodiment of the present invention, a window can range from 2 to 4 cells high and from 5 to 20 scans long. This translates into a window having a maximum height of 1.5 inches and a maximum length of 6.5 inches. If a window did not fit within the predetermined range, the coordinates of the window are zeroed at step 414. The 0 is output to main loop subroutine 302 indicating a horizontally or vertically split window, or a window that is bigger or smaller than the preselected size.

Figure 13:
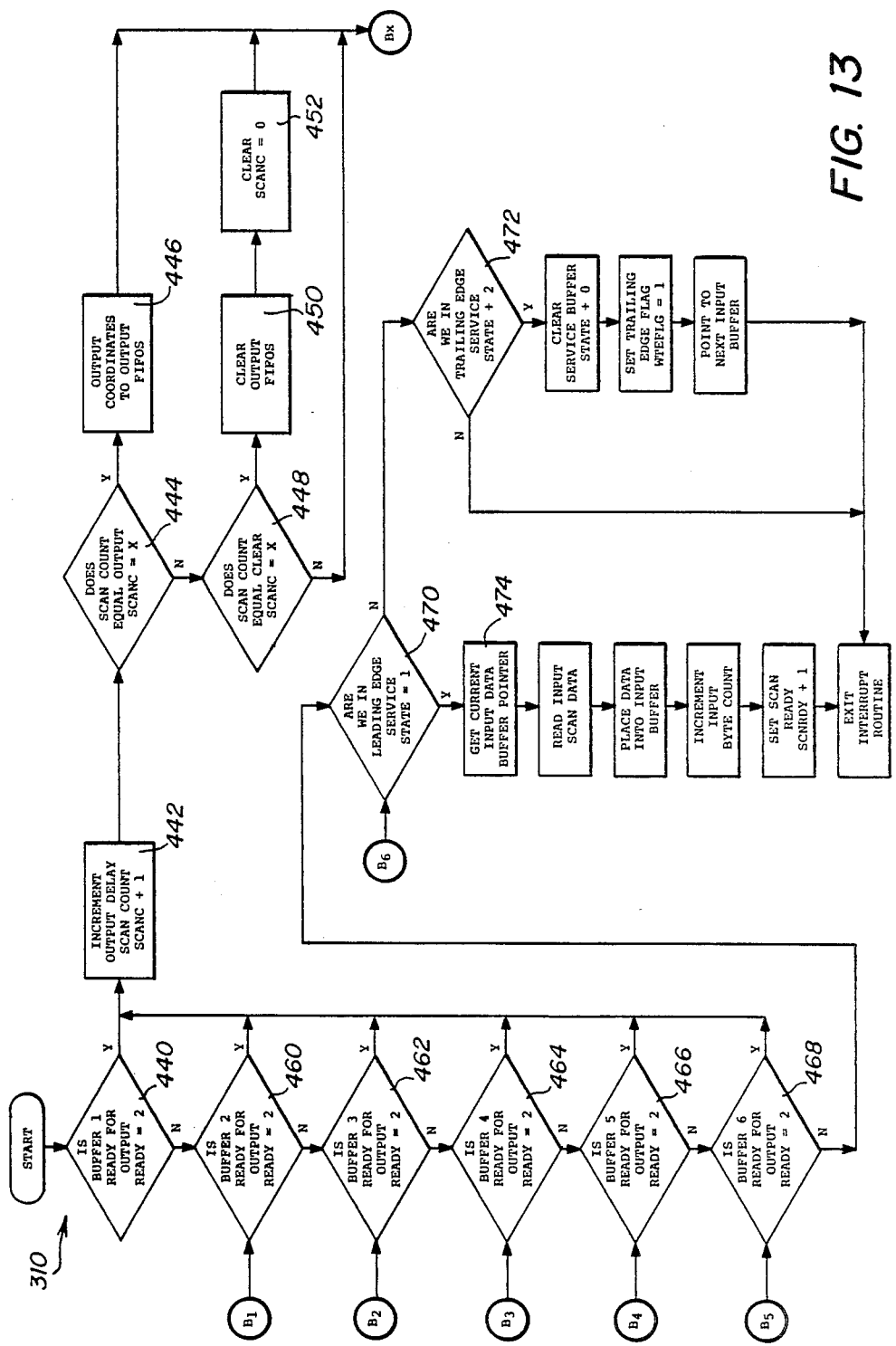

Referring now to FIG. 13, the segment interrupt subroutine 310 is illustrated. In order to synchronize the operation of the camera of camera/window detect circuitry 34 with the camera 20 (FIG. 1), and to insure that the letter mail item being processed by both these cameras is the same, subroutine 310 introduces a delay. Segment interrupts are counted until the data is output by circuitry 36 (FIG. 1). After the coordinates of the window have been calculated by calculation routine 306, and these coordinates are ready to be output a decision is made at inquiry 440 to determine if buffer 1 is ready for an output. The ready flag is set equal to 2. If buffer 1 is ready for an output, the output delay scan count is incremented at step 442. A decision is then made at inquiry 444 to determine if the end count equals the output scan count. If this inquiry is true, the output coordinates of the window are output to buffer 246 (FIG. 7) at step 446. Buffer 246 (FIG. 7) includes capacity for processing six documents. If the decision at inquiry 444 is that the scan count does not equal the output scan count, a decision is made at inquiry 448 to determine if the scan count equals the clear scan count. If this inquiry is yes, the output buffers 246 (FIG. 7) are cleared and the clear scan count is set equal to 0 at steps 450 and 452, respectively. The segment interrupt subroutine 310 then returns to the main loop subroutine 302.

If buffer 1 was not ready for output at inquiry 440, the segment interrupt subroutine 310 checks each of the other five buffers which is ready to output coordinate data. If the buffer is not ready, the next succeeding buffer is checked at inquiries 460, 462, 464, 466 and 468. If none of the buffers are ready to output data, the decision is made at inquiry 470 to determine if the leading edge of a document has occurred. If a leading edge has not occurred, the inquiry is made to determine whether the trailing edge of the document has occurred at inquiry 472. If the trailing edge has not occurred, segment interrupt subroutine 310 is exited and the program returns to main loop subroutine 302. Segment interrupt subroutine 310 therefore functions to determine if a buffer is ready to output coordinate data or if a leading or trailing edge has been detected. If any of the buffers are ready for output, the program increments a scan count and then determines if the scan count is equal to 2 or a predetermined number "X" at inquiry 444. If the scan count is not equal to the predetermined number, the scan count has not been incremented high enough, it is therefore incremented and the next buffer is checked. If a leading edge is detected at inquiry 470, the current input data buffer pointer is obtained at step 474, the input scan data is read and placed into the buffer and the input byte count is incremented. The scan ready count is set and incremented in the segment interrupt subroutine is exited to the main loop subroutine 302 indicating that a new scan is ready to be processed for the sum subroutine 304. If inquiry at 472 is that a trailing edge has been detected the service buffer is cleared and the trailing edge flag is reset. The next buffer is then pointed to for receiving coordinate data.

Figure 14:
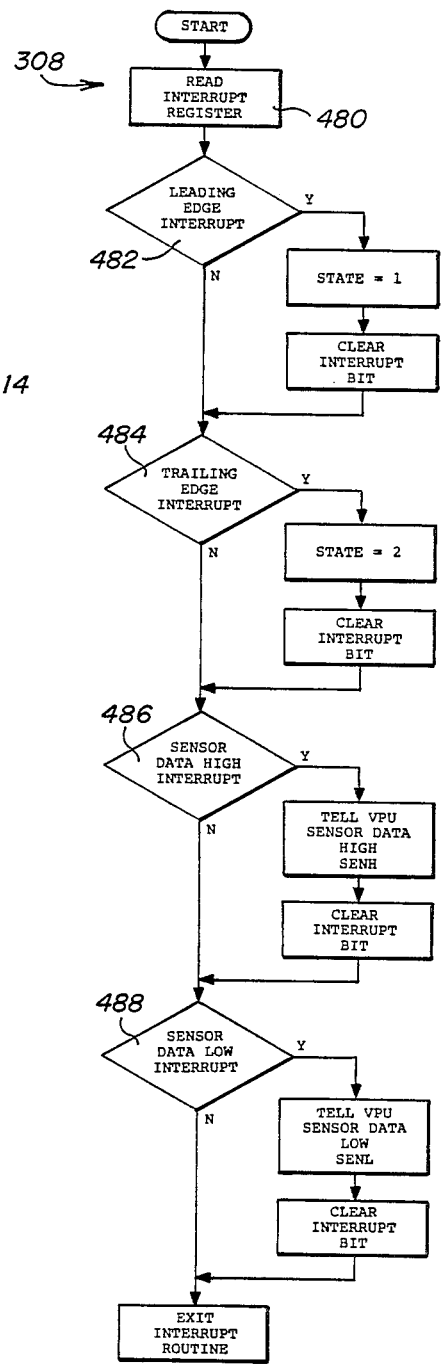

Referring now to FIG. 14, the status interrupt subroutine 308 is illustrated. Status interrupt occurs whenever it is written into interrupt controller 238 (FIG. 7). Once microprocessor 206 receives the interrupt, microprocessor 206 reads data in controller 238 at step 480. The decision is made at inquiry 482 to determine if the interrupt was a leading edge of the document or at inquiry 484 whether the interrupt was a trailing edge interrupt or at inquiry 86 whether the interrupt was a sensor data high interrupt or a sensor data low interrupt at inquiry 488. If the interrupt was a leading edge interrupt, interrupt is set to state 1 and the interrupt bit is cleared. If a trailing interrupt occurred at inquiry 484, the data is set to 2 and the interrupt bit is cleared. If the sensor data high or low interrupt occurred indicating that circuitry 34 (FIG. 1) terminated the transmission of data to circuitry 36, the interrupt is generated to microprocessor 206. The respective interrupt bits are cleared and the program exits to the main loop subroutine 302.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A system for locating possible address information contained in a window area on a mail item including:

a plurality of photoemitters, each of said photoemitters generating a collimated beam of light directed onto the surface of the mail item for illumination thereof, to provide an angle of incidence of illumination onto the mail item at approximately 50° from a plane perpendicular to the mail item;

a plurality of photodetectors, each of said photodetectors sensing the reflectivity from the mail item caused by said plurality of photoemitters, said pluralilty of photodetectors being disposed at an angle to sense reflections from the mail item at approximately negative 50° from the plane perpendicular to the mail item, and each of said photodetectors generating an output signal proportional to the amount of sensed reflectivity;

window detecting means responsive to said plurality of photodetectors for determining the location of a window on the mail item wherein said window may include a specularly reflective material, a diffusely reflective material, or a cut-out window;

means connected to said plurality of photoconductors for computing the average of the sum of the output signals of said plurality of photodetectors and for adding a predetermined threshold value to said average of the sum of the output signals for generating a variable threshold signal;

first comparator means for comparing the output of said plurality of photodetectors with said variable threshold signal for determining the presence of a diffuse window on the mail item or the presence of a window on a specularly reflective mail item;

means for generating a fixed threshold value;

second comparator means for comparing the output of said plurality of photodetectors with said fixed threshold value for determining the presence of a cut-out window on the mail item;

a first linear polarizer disposed between said plurality of photoemitters and the mail item and parallel to a plane containing said plurality of photoemitters for blocking the diffuse component of illumination without substantially decreasing the specular component of illumination;

a second linear polarizer disposed between said plurality of photodetectors and the mail item and parallel to a plane containing said plurality of photodetectors for blocking the diffuse component of reflections from the mail item without substantially decreasing the specular component of the reflections from the mail item;

means for reading address information contained on the mail item; and means for selecting address information read by said reading means where the address information is contained within a window located by said window detecting means.

2. The system for locating possible address information contained in a window area on a mail item of claim 1 wherein said fixed threshold value is selected to be approximately 50% higher than said variable threshold value.

* * * * *